United States Patent
Hiddle

(10) Patent No.: US 7,593,323 B2
(45) Date of Patent: Sep. 22, 2009

(54) APPARATUS AND METHODS FOR MANAGING NODES ON A FAULT TOLERANT NETWORK

(75) Inventor: Frederick Hiddle, Bryn Mawr, PA (US)

(73) Assignee: Honeywell International Inc., Morristown, NJ (US)

( * ) Notice: Subject to any disclaimer, the term of this patent is extended or adjusted under 35 U.S.C. 154(b) by 523 days.

(21) Appl. No.: 11/205,693

(22) Filed: Aug. 17, 2005

(65) Prior Publication Data

US 2007/0041313 A1    Feb. 22, 2007

(51) Int. Cl.
*G01R 31/08* (2006.01)
(52) U.S. Cl. ..................................... 370/225
(58) Field of Classification Search .......... 370/216–228
See application file for complete search history.

(56) References Cited

U.S. PATENT DOCUMENTS

| | | | |
|---|---|---|---|
| 6,133,846 | A | 10/2000 | Birkedahl et al. |
| 6,275,503 | B1 | 8/2001 | Driscoll |
| 6,308,282 | B1 | 10/2001 | Huang et al. |
| 6,373,376 | B1 | 4/2002 | Adams et al. |
| 6,448,901 | B1 | 9/2002 | Adams et al. |
| 6,467,003 | B1 | 10/2002 | Doerenberg et al. |
| 6,851,621 | B1 | 2/2005 | Wacker et al. |
| 6,901,443 | B1 | 5/2005 | Huang et al. |
| 7,305,486 | B2 * | 12/2007 | Ghose et al. ................. 709/232 |
| 2005/0129037 | A1 | 6/2005 | Zumsteg et al. |
| 2006/0182128 | A1* | 8/2006 | Nakata et al. ................ 370/401 |
| 2006/0203720 | A1* | 9/2006 | Kano .......................... 370/228 |

FOREIGN PATENT DOCUMENTS

WO     WO 00/28715 A     5/2000

* cited by examiner

*Primary Examiner*—Kwang B Yao
*Assistant Examiner*—Tung Q Tran
(74) *Attorney, Agent, or Firm*—Munck Carter, LLP

(57) ABSTRACT

Devices, systems and methods for managing communications traffic on a fault tolerant network are disclosed. The exemplary system may include a fault tolerant network with at least two nodes and at least two channels of communication. Each channel of communication is in communication with each of the two nodes. Each node selectively communicates on one of the plurality of channels. A switch is in communication with the at least two channels. The switch receives network traffic and terminates network traffic on one or more of the channels. The termination of network traffic causes a fault tolerance manager to reroute network traffic on one of the two communication channels based on received network traffic.

17 Claims, 4 Drawing Sheets

US 7,593,323 B2

1

APPARATUS AND METHODS FOR MANAGING NODES ON A FAULT TOLERANT NETWORK

FIELD OF THE INVENTION

The present invention relates generally to computer networks, and more particularly to managing communications traffic on a fault tolerant network.

BACKGROUND OF THE INVENTION

Networks provide communications from one node on a network to other nodes on the network. The nodes may include a variety of equipment that utilize the network to communicate information to other equipment on the network. For example, a workstation on a network may communicate with a server or a printer over the network. In a more basic network, a sensor may communicate information to a base computer, which may communicate information to a mechanical actuator. The base computer may communicate with a variety of sensors and a mechanical actuator to perform a desired operation.

The communication channel provides a medium to allow the network to communicate with the network nodes. The communication channel may be one or more conductive wires or optical cables. The communication channel may be a wireless communication channel using, for example, radio frequencies, microwaves, or infrared.

The network may be a Local Area Network (LAN). The nodes on the LAN may communicate with other LANs via a Wide Area Network. To provide routing of the data within a network and to various other connected networks, the network may use equipment to facilitate routing of data. For example, switches, routers, hubs, bridges may be used to transmit and communicate data between nodes and networks.

The network may use a protocol to allow the nodes to receive and transmit data. One of the most commonly used protocols is Ethernet. Ethernet allows nodes to package data, transmit the data to the desired node, and unpackage the data at the desired node. The nodes on the Ethernet network may use a network interface card to supply data from the node to the communication channel.

The Ethernet protocol also provides recovery of data that may be corrupted or lost during transmission. However, the protocol cannot recover when nodes or equipment on the network lose connection with the network. Fault tolerance is often provided to assure continued node-to-node communications. Redundancy of components on the networks allows the node to communicate over a secondary component when the primary component fails. Nodes of the fault tolerant network may have more than one network interface cards, and include nodes having multiple communication paths. A network fault tolerance manager oversees detection of failures and manipulation of failure recovery. Failure recovery includes redirecting data transmission of a node or component indicating a failure. The fault tolerance manager may terminate communications over a primary network interface card or communication path.

Even though the fault tolerant network may restore communications over a secondary component of the network, the node attached to an Ethernet network can sometimes suffer conditions that cause the node to generate inordinate amounts of traffic, assume the electronic identity of other nodes attached to the network, or otherwise interfere with the desired operation of the network. In a fault tolerant network deployed in a critical application, this failure mode could cause loss of visibility of that node or other nodes on the network. In some cases, this failure could cause loss of control of equipment associated with the node.

Accordingly, an efficient and effective system and method is needed for preventing error communication from failed nodes or equipment from interfering and/or preventing legitimate communication by other nodes on the network. In addition, the system and method may provide information to the fault tolerance manager regarding which components or equipment of the network are generating error communications.

SUMMARY OF THE INVENTION

It is, therefore, an objective of the present invention to provide devices, systems, and methods to manage communications traffic on a fault tolerant network. According to an exemplary embodiment of the present invention, a fault tolerant network may have two or more nodes. The system may have two or more channels of communication. Each channel of communication couples the two or more nodes. Each node selectively communicates on one of the two or more channels of communication. The system also has a switch in communication with the two or more channels. The switch receives network traffic and terminates network traffic on two or more of the channels of communication. The termination of network traffic causes a fault tolerance manager to reroute network traffic on one of the two or more communication channels.

In an alternate embodiment, the switch may terminate network traffic based on network traffic errors received or the volume of network traffic. In another embodiment, the switch has a network traffic analysis for determining network traffic statistics. The switch may communicate the network traffic statistics to the fault tolerance manager. In another embodiment, the termination of network traffic by the switch is controlled or dictated by the fault tolerance manager. In yet another embodiment, the termination of network traffic by the switch terminates traffic from selective nodes.

BRIEF DESCRIPTION OF THE DRAWINGS

The above and other objectives and advantages of the present invention will be apparent upon consideration of the following detailed description, taken in conjunction with the accompanying drawings, in which like reference numbers refer to like parts throughout, and in which.

DETAILED DESCRIPTION OF THE INVENTION

Figure 1:
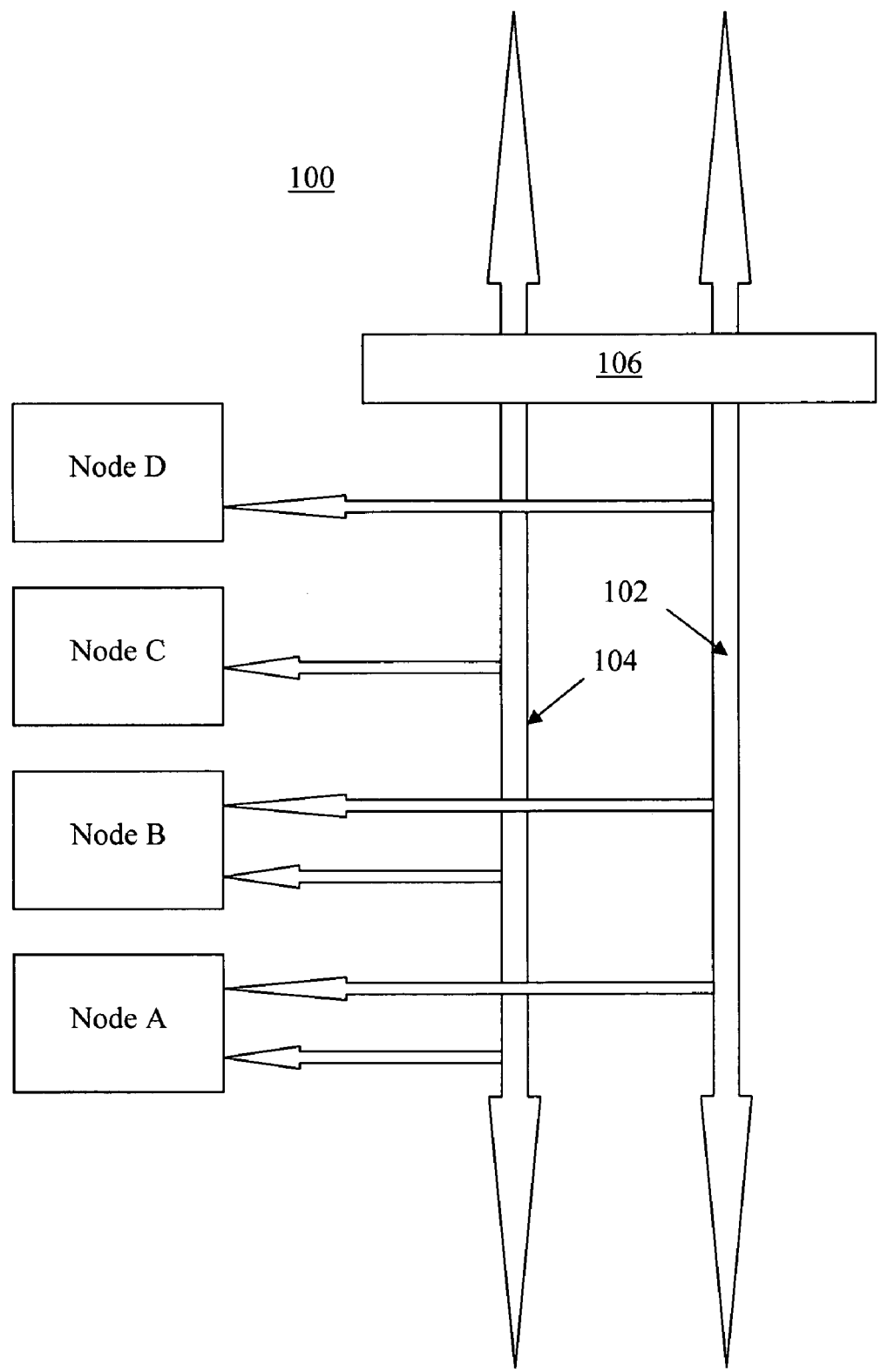
FIG. 1 is a generalized schematic of an exemplary communications network used to implement embodiments of the present invention.

A fault tolerance network 100, as shown in FIG. 1, provides nodes with additional equipment and communication channels for network communications. Network communications are transmitted and received over two or more communication channels. A first communication channel 102 provides network communication between the nodes. If the first communication channel 102 should fail, the fault tolerance manager (not shown) may reroute communication over a second communication channel 104.

The fault tolerance network 100 may have some nodes with multiple network interface cards, for example, Node A and Node B as shown in FIG. 1. The fault tolerance network 100 may also have some nodes with single network interface card coupled to the communication channels of the network, for example, Node C and Node D. A switch 106, according to an exemplary embodiment, is provided to control communication traffic over the network communication channels 102 and 104. The switch 106 may terminate network traffic over the first communication channel 102 or the second communication channel 104, causing the fault tolerance manager to reroute network traffic.

When in use, the fault tolerance network 100 provides redundant equipment to compensate for equipment failure. For example, if the network interface card coupling Node A to the first communication channel 102 should fail, the fault tolerance manager may terminate communication to Node A through that network interface card. The fault tolerance manager will begin sending communications destined for Node A to a second network interface card via the second communication channel 104. The fault tolerance network may also compensate for failure of a communication channel. For example, if the first communication channel 102 should fail at a point between Node B and Node A, the fault tolerance manager may continue to transmit communications to Node B via the first communication channel 102. To correct the problem associated with not being capable of sending communications over the first communication channel 102 beyond Node B, the fault tolerance manager may begin sending communications over the second communication channel 104. When equipment of the network fails or the manager node terminates network communication to a component, error messages may continue to be transmitted by the failing or terminated components. These error messages may produce unnecessary congestion or interfere with legitimate network traffic.

According to an exemplary embodiment of the present invention, the switch 106 may detect the increase in error communications from the terminated node A. The switch 106 may independently terminate communications on the first communication channel 102. The fault tolerance manager may correct the failure to communicate to node A and node B by transmitting communications to the second network interface card of node A and node B. The switch 106 may successfully prevent error communication from interfering with legitimate communication and allow the fault tolerance manager to reroute the communications for node A and node B to the second communication path 104.

Architecturally in terms of hardware, the switch 106 may include a processor, memory, and one or more input and output interface devices. The local interface may have additional elements, which are omitted for simplicity, such as controllers, buffers (caches), drivers, repeaters, and receivers, to enable communications. Further, the local interface may include address, control, and/or data connections to enable appropriate communications among the components of a network.

The systems and methods may also be incorporated in software used with a computer or other suitable operating device of the switch. The software stored or loaded in the memory may include one or more separate programs, each of which comprises an ordered listing of executable instructions for implementing the methods and systems of the invention. The software may work in conjunction with an operating system. The operating system essentially controls the execution of the computer programs, such as the software stored within the memory, and provides scheduling, input-output control, file and data management, memory management, and communication control and related services. The system and method may also include a Graphic User Interface (GUI) to allow the administrator or user to enter constraints associated with the switch 106 managing communications traffic on a fault tolerant network, as will be discussed later herein.

Figure 2:
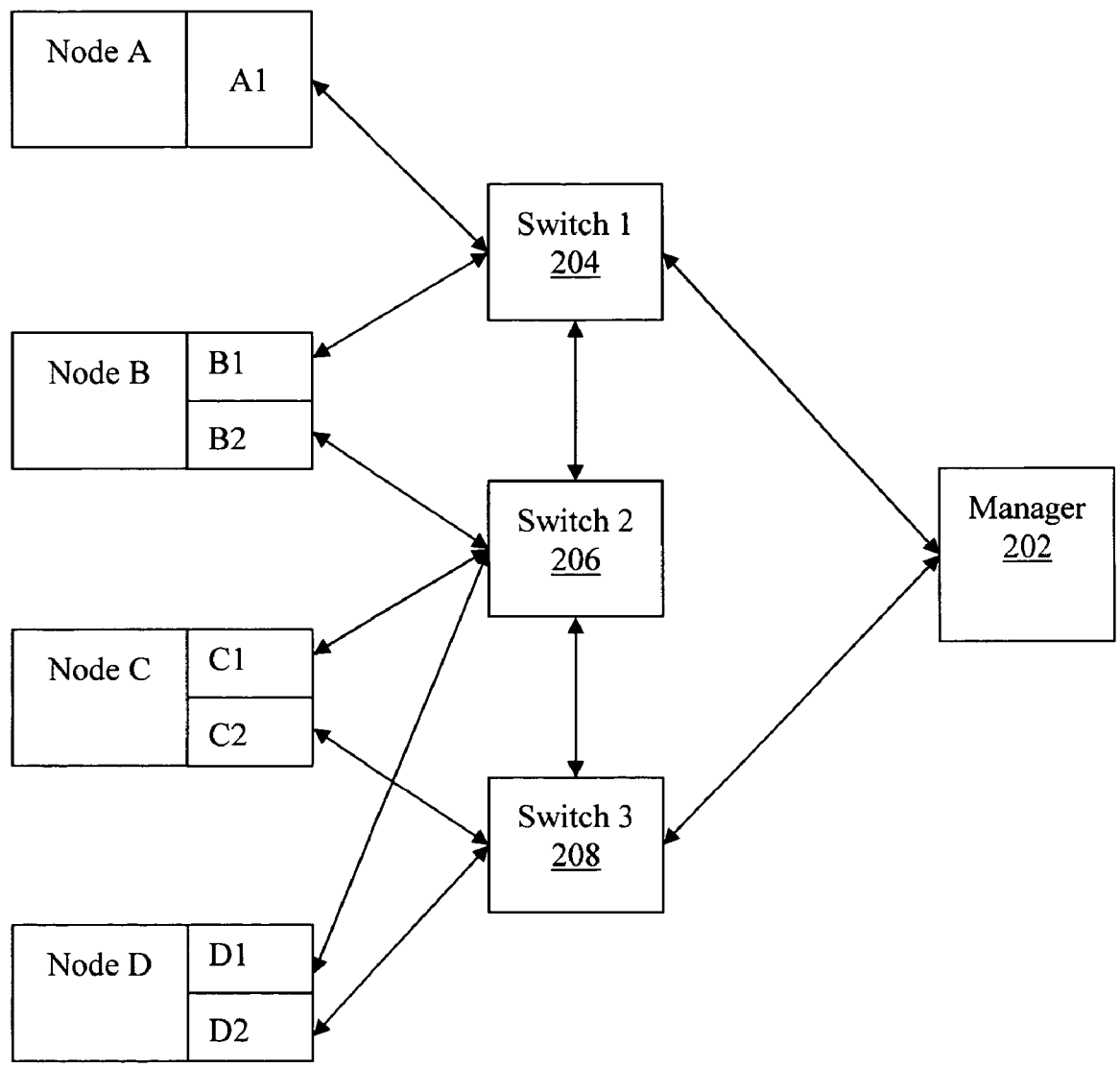
FIG. 2 is a block diagram of the communications network used to implement embodiments of the present invention.

FIG. 2 is a block diagram of the communications network used to implement embodiments of the present invention. The fault tolerant network 200 contains a fault tolerance manager 202. The fault tolerance manager 202 is connected to a first network switch 204, a second network switch 206 and a third network switch 208 in an open ring arrangement. A variety of communication channels connect the network switches and nodes A, B, C, and D. FIG. 2 depicts just three network switches and four nodes connected to the communication channels, although any number of nodes may be connected to any number of switches as long as those numbers remain compliant with the protocol of the network and the limit of switch port numbers. Furthermore, nodes may be connected directly to a communication channel in a manner similar to that depicted in FIG. 1.

The fault tolerance manager 202 controls the communication channels for the nodes of the network. A local failure in the fault tolerant network 200 may be characterized by a device failure affecting communications to one network interface card of a node. For example, a local failure of network interface card D1 of node D may result in the fault tolerance manager switching to network interface card D2. Node D may now communicate via network interface card D2 and the third switch 208.

While Node D no longer communicates traffic over network interface card D1, the second switch 206 may still receive a high volume of error traffic generated by the failure of network interface card D1 or the component of the network related to the failure. According to an exemplary embodiment of the invention, the second switch 206 may recognize the high volume of error traffic generated by network interface card D1. The second switch 206 may terminate network traffic received from network interface card D1. By taking this action the second switch 206 prevents the error message from propagating through the communication network and creating unnecessary congestion or further errors in communication.

The switch may also take additional measures by terminating all network traffic via the switch and allowing the fault tolerance manager to take appropriate action. According to the above example, the second switch 206 may terminate all communications. The fault tolerance manager 202 may direct communication from Node B through the first network interface card B1 and the first switch 204. The fault tolerance manager 202 may also direct communication from Node C through the second network interface card C2 and the third switch 208. The result of the second switch 206 terminating all traffic allows the communication network to continue communication while preventing errors generated by the first network interface card C1 of node C from propagating through the network and causing further problems.

The above example is for illustrative purposes. A variety of complex actions may be taken by the switch as one skilled in the art will appreciate. For example, the switch may be in communication with the fault tolerance manager or have memory to store the predefined procedures of the fault tolerance manager. These predefined procedures are the actions the fault tolerance manager will take based upon specific network component failures. The switch may sort through and analyze these actions and perform certain actions to cause the fault tolerance manager to react. The switch may also have a variety of predefined threshold levels that determine when and which actions should be performed by the switch. For example, if the switch receives a predefined volume of network traffic, the switch may terminate communication.

The switch may use a variety of stored thresholds and actions to control error traffic in the network. These actions and thresholds may be standardized and set based upon a specific general network configuration and fault tolerance manager. The actions and thresholds may be customized based upon parameters entered by a user or an administrator as previously discussed. The switch may also recognize components supported by the switch and define actions based upon the supported components.

In the exemplary system of FIG. 2, the first switch 204 may recognize, either via instructions by the administrator or another identification process, that node A must communicate via the first switch 204. The first switch 204 may determine that a relatively high threshold of error traffic is required before terminating communication. This is because communication to node A will be lost if the first switch terminates all communication. The threshold may take into account errors interrupting network traffic as a whole and the need for communication with node A. While this is a relatively simple example, one skilled in the art will appreciate complex algorithms the switch may perform when taking into account the number of nodes and network components seen by a switch in a realistic communication network.

The switch may take into account a variety of failure detection modes used by a fault tolerance manager. A variety of failure detection modes used by fault tolerant networks are known. The switch may be used with a variety of these failure detection modes to aid the fault tolerant network in detecting a failure of at least one network component and responding to that failure.

In an alternate embodiment, the switch may also gather network communication statistics and report the statistics to the fault tolerance manager. The fault tolerance manager can use these statistics to determine the appropriate communication channels and equipment to utilize. The switch may communicate the error traffic to the fault tolerance manager via the communication channel of the network using the protocol of the network. Alternatively the switch may have an independent communication channel to communicate with the fault tolerance manager.

The statistics gathered by the switch may not be seen by the fault tolerance manager. For example, an error message may not be propagated by the switch and may not viewed by the fault tolerance manager. The invention allows the switch to gather this information and communicate the information to the fault tolerance manager. An aspect of this embodiment will be described in greater detail later herein.

Figure 3:
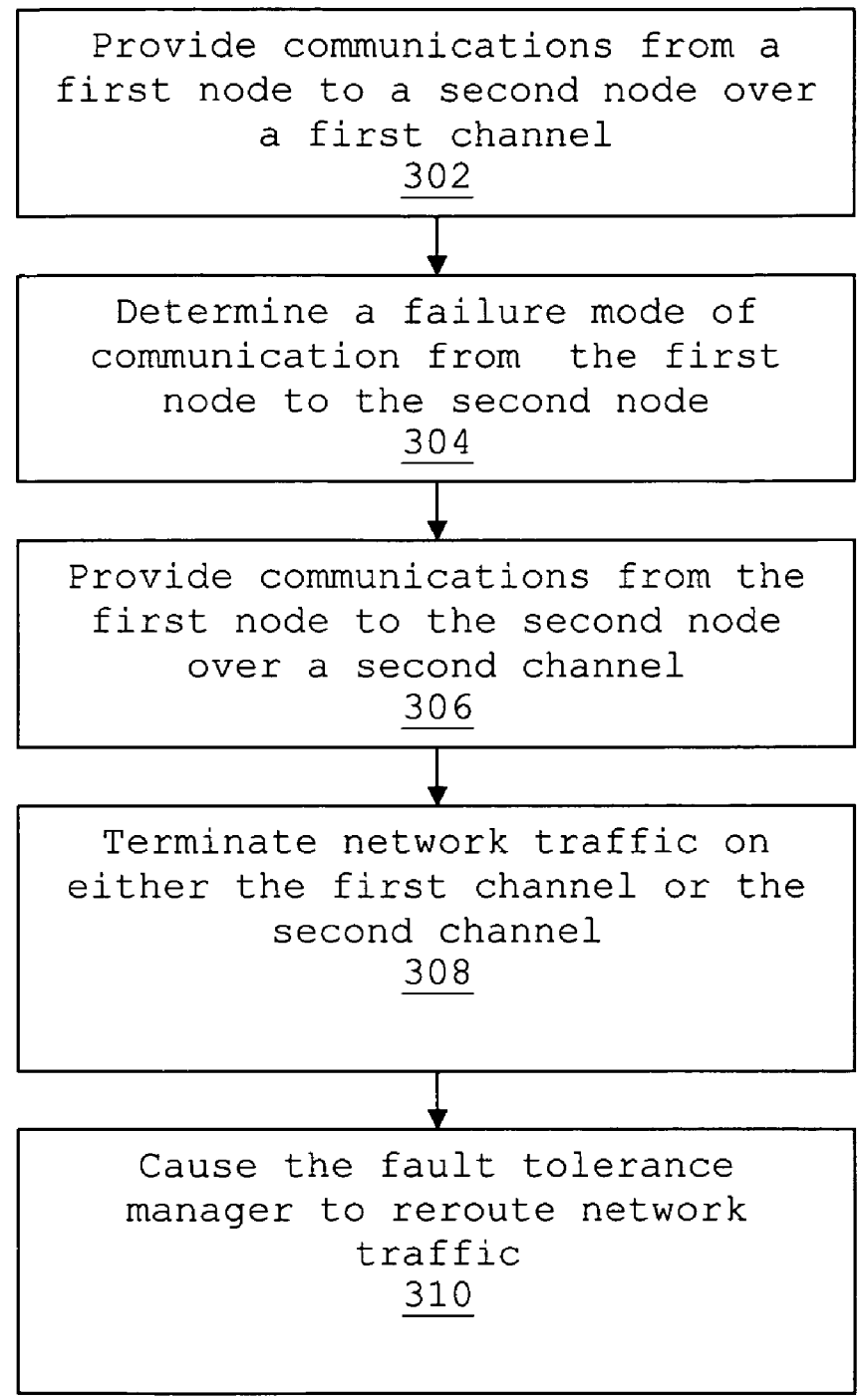
FIG. 3 is a flow chart illustrating a first exemplary embodiment of the present invention.

FIG. 3 is a flow chart illustrating a first exemplary method 300 of the present invention. According to the first exemplary method 300, the switch provides communications from a first node to a second node over a first channel (block 302). The switch determines a failure mode of communication from the first node to the second node (block 304). As previously discussed, the switch may take into account a variety of factors to determine when an action should be taken. This may include, for example, a traffic threshold, equipment available to the network, and modes or actions of the fault tolerance manager.

The switch provides communications from the first node to the second node over a second channel (block 306). The switch may terminate network traffic on either the first channel or the second channel (block 308). The termination of network traffic or actions taken by the switch causes the fault tolerance manager to reroute network traffic (block 310). This allows the switch to control and change network traffic based on local network traffic that may not be viewed by the fault tolerance manager. As previously discussed, the switch may be preprogrammed to take into account a variety of network factors as well as factors specific to the fault tolerance manager and actions taken by the fault tolerance manager.

Figure 4:
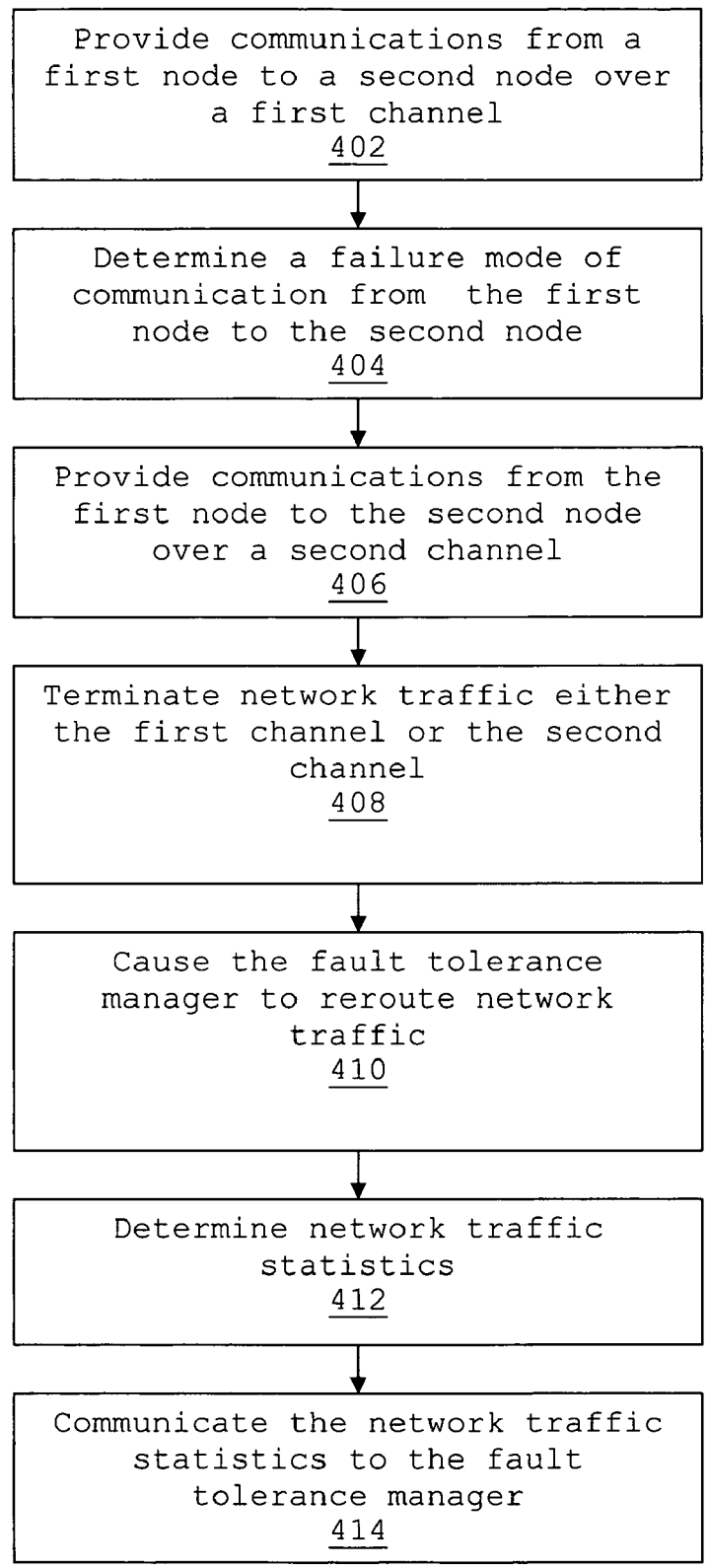
FIG. 4 is a flow chart illustrating a second exemplary embodiment of the present invention.

FIG. 4 is a flow chart illustrating a second exemplary embodiment 400 of the present invention. According to the second exemplary method 400, the switch provides communications from a first node to a second node over a first channel (block 402). Similar to the first exemplary method 300, the switch determines a failure mode of communication from the first node to the second node (block 404). The switch also provides communications from the first node to the second node over a second channel (block 406). The switch may terminate network traffic on either the first channel or the second channel (block 408). The termination of network traffic or actions taken by the switch causes the fault tolerance manager to reroute network traffic (block 410), as previously discussed with regard to the first exemplary method 300.

The switch may determine network traffic statistics (block 412). For example, the switch may record the amount and components generating network traffic. The switch may compute and analyze these statistics. The statistics may take into account the total volume of traffic transmitted by the switch. The switch may use these statistics to determine what actions to take. The switch may alternatively communicate the network traffic statistics to the fault tolerance manager (block 414). The network traffic statistics may include all the data gathered by the switch or a summarized version of the statistics. The fault tolerance manager may utilize these statistics to determine an appropriate fault tolerance mode or other action.

It will be understood that the foregoing is only illustrative of the principles of the invention and that various modifications can be made by those skilled in the art without departing from the scope and spirit of the invention. Accordingly, such embodiments will be recognized as within the scope of the present invention. For example, the exemplary embodiments are illustrated as being implemented within a switch of the network, however, one skilled in the art will appreciate that embodiments of the invention may be implemented with a variety of network components, for example, routers, hubs, and servers.

Persons skilled in the art will appreciate that the present invention can be practiced by other than the described embodiments, which are presented for purposes of illustration rather than of limitation and that the present invention is limited only by the claims that follow.

What is claimed is:

1. A fault tolerant network, comprising:
    at least two nodes including a first node and a second node, wherein each node selectively communicates over at least one of a plurality of channels; and
    a switch that selectively communicates with the first node over at least a first of the channels and that selectively communicates with the second node over at least the first channel and a second of the channels;
    wherein the switch terminates network traffic from the first and second nodes on the first channel based on error messages transmitted over the first channel by the first node, causing a fault tolerance manager to reroute network traffic for at least the second node to the second channel wherein the switch terminates the network traffic when a number of error messages exceeds a lower threshold if the first node is coupled to multiple switches and a higher threshold if the first node is coupled to a single switch.

2. The fault tolerant network of claim 1, wherein:
the switch selectively communicates with the first node over at least the first channel and the second channel; and
the termination of the network traffic on the first channel also causes the fault tolerance manager to reroute network traffic for the first node to the second channel.

3. The fault tolerant network of claim 1, wherein switch further comprises:
a network traffic analyzer for determining network traffic statistics.

4. The fault tolerant network of claim 3, wherein the switch communicates the network traffic statistics to the fault tolerance manager.

5. The fault tolerant network of claim 1, wherein the termination of network traffic by the switch is controlled by the fault tolerance manager.

6. The fault tolerant network of claim 1, wherein the termination of network traffic by the switch is dictated by the fault tolerance manager.

7. The fault tolerant network of claim 1, wherein the termination of the network traffic by the switch terminates traffic from one or more specified nodes.

8. A method of managing communications for a switch in a fault tolerant network, comprising:
selectively communicating with a first node over at least a first channel and selectively communicating with a second node over at least the first channel and a second channel;
determining a failure mode of communication involving the first channel; and
terminating network traffic from the first and second nodes on the first channel based on error messages transmitted over the first channel by the first node, which causes a fault tolerance manager to reroute network traffic for at least the second node to the second channel;
wherein terminating the network traffic comprises terminating the network traffic when a number of error messages exceeds a lower threshold if the first node is coupled to multiple switches and a higher threshold if the first node is coupled to a single switch.

9. The method of claim 8, wherein:
selectively communicating with the first node comprises selectively communicating with the first node over at least the first channel and the second channel; and
terminating the network traffic causes the fault tolerance manager to reroute network traffic for the first node to the second channel.

10. The method of claim 8, further comprising:
determining network traffic statistics.

11. The method of claim 10, further comprising:
communicating the network traffic statistics to the fault tolerance manager.

12. The method of claim 8, wherein terminating the network traffic is controlled by the fault tolerance manager.

13. The method of of claim 8, wherein terminating the network traffic terminates traffic from one or more specified nodes.

14. A machine-readable medium having instructions stored thereon for causing a machine to manage communications for a switch in a fault tolerant network, the instructions comprising instructions for:
selectively communicating with a first node over at least a first channel and selectively communicating with a second node over at least the first channel and a second channel;
determining a failure mode of communication involving the first channel;
terminating network traffic from the first and second nodes on the first channel based on error messages transmitted over the first channel by the first node, which causes a fault tolerance manager to reroute network traffic for at least the second node to the second channel;
wherein the instructions for terminating the network traffic comprise instructions for terminating the network traffic when a number of error messages exceeds a lower threshold if the first node is coupled to multiple switches and a higher threshold if the first node is coupled to a single switch.

15. The machine-readable medium of claim 14, wherein:
the instructions for selectively communicating with the first node comprise instructions for selectively communicating with the first node over at least the first channel and the second channel; and
the instructions for terminating the network traffic cause the fault tolerance manager to reroute network traffic for the first node to the second channel.

16. The machine-readable medium of claim 14, further comprising instructions for determining network traffic statistics.

17. The machine-readable medium of claim 16, further comprising instructions for, communicating the network traffic statistics to the fault tolerance manager.

* * * * *

UNITED STATES PATENT AND TRADEMARK OFFICE
CERTIFICATE OF CORRECTION

PATENT NO. : 7,593,323 B2
APPLICATION NO. : 11/205693
DATED : September 22, 2009
INVENTOR(S) : Frederick Hidle It is certified that error appears in the above-identified patent and that said Letters Patent is hereby corrected as shown below:

On the title page, item (75), delete "Frederick Hiddle" and add --Frederick Hidle--.

Signed and Sealed this

Twenty-seventh Day of October, 2009

David J. Kappos
*Director of the United States Patent and Trademark Office*

UNITED STATES PATENT AND TRADEMARK OFFICE
CERTIFICATE OF CORRECTION

PATENT NO.        : 7,593,323 B2
APPLICATION NO. : 11/205693
DATED             : September 22, 2009
INVENTOR(S)       : Frederick Hidle It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 924 days.

Signed and Sealed this

Twenty-first Day of September, 2010

David J. Kappos
*Director of the United States Patent and Trademark Office*